(12) United States Patent
Ishizuka

(10) Patent No.: US 9,638,954 B2
(45) Date of Patent: May 2, 2017

(54) DISPLAY APPARATUS AND BACKLIGHT

(71) Applicant: FUNAI ELECTRIC CO., LTD., Osaka (JP)

(72) Inventor: Yuki Ishizuka, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 224 days.

(21) Appl. No.: 14/248,453

(22) Filed: Apr. 9, 2014

(65) Prior Publication Data
US 2014/0307420 A1    Oct. 16, 2014

(30) Foreign Application Priority Data

Apr. 12, 2013 (JP) ................. 2013-084099

(51) Int. Cl.
*G09F 13/04* (2006.01)
*G09F 13/08* (2006.01)
*G02F 1/1335* (2006.01)

(52) U.S. Cl.
CPC .......... *G02F 1/133603* (2013.01); *G02F 2001/133612* (2013.01)

(58) Field of Classification Search
CPC ............ G02F 1/133603; G02F 2001/133612
USPC ............... 362/97.1–97.3, 600–634, 249.02
See application file for complete search history.

(56) References Cited

U.S. PATENT DOCUMENTS

| 7,713,092 | B2 | 5/2010 | Kim et al. |
| 8,144,286 | B2 | 3/2012 | Tomiyoshi |
| 8,305,518 | B2 | 11/2012 | Tomiyoshi |
| 8,553,170 | B2 | 10/2013 | Park et al. |
| 8,570,457 | B2 | 10/2013 | Tomiyoshi |
| 2006/0289201 | A1 | 12/2006 | Kim et al. |
| 2008/0036940 | A1 | 2/2008 | Song et al. |
| 2010/0039579 | A1 | 2/2010 | Park et al. |
| 2010/0097541 | A1 | 4/2010 | Tomiyoshi |
| 2011/0090259 | A1 | 4/2011 | Kang et al. |
| 2011/0310590 | A1* | 12/2011 | Yamashita ........ G02F 1/133609 362/97.1 |

(Continued)

FOREIGN PATENT DOCUMENTS

| JP | 2005-353498 | 12/2005 |
| JP | 2007-5302 | 1/2007 |

(Continued)

*Primary Examiner* — Andrew Coughlin
*Assistant Examiner* — Jessica M Apenteng
(74) *Attorney, Agent, or Firm* — Wenderoth, Lind & Ponack, L.L.P.

(57) ABSTRACT

A first LED substrate and a second LED substrate are included each of which includes: on a main surface thereof, a plurality of LEDs connected in series in a longitudinal direction; a first connector including (i) a first terminal disposed on one of short sides of the LED substrate and connected to an anode of an LED positioned first among the LEDs connected in series, and (ii) a second terminal connected to a cathode of another LED positioned last among the LEDs connected in series. The second terminal of the first LED substrate and the first terminal of the second LED substrate are interconnected. The first terminal of the first LED substrate is connected to a positive terminal of a power circuit and the second terminal of the second LED substrate is connected to a negative terminal of the power circuit.

8 Claims, 15 Drawing Sheets

(56) References Cited

U.S. PATENT DOCUMENTS

| | | |
|---|---|---|
| 2012/0147290 A1 | 6/2012 | Tomiyoshi |
| 2012/0175650 A1 | 7/2012 | Tomiyoshi et al. |
| 2013/0027638 A1 | 1/2013 | Tomiyoshi |
| 2013/0141652 A1 | 6/2013 | Kuromizu |
| 2014/0028952 A1 | 1/2014 | Park et al. |

FOREIGN PATENT DOCUMENTS

| | | |
|---|---|---|
| JP | 2008-41639 | 2/2008 |
| JP | WO2008/108039 | 9/2008 |
| JP | 2010-45017 | 2/2010 |
| JP | 2010-62556 | 3/2010 |
| JP | 2010-128049 | 6/2010 |
| JP | 2011-119771 | 6/2011 |
| JP | 2012-9220 | 1/2012 |
| JP | 2012-48964 | 3/2012 |
| JP | 2012-84327 | 4/2012 |
| WO | 2008/108039 | 9/2008 |
| WO | 2011/043094 | 4/2011 |
| WO | 2012/023321 | 2/2012 |

* cited by examiner

DISPLAY APPARATUS AND BACKLIGHT

CROSS REFERENCE TO RELATED APPLICATION

The present application is based on and claims priority of Japanese Patent Application No. 2013-084099 filed on Apr. 12, 2013. The entire disclosure of the above-identified application, including the specification, drawings and claims is incorporated herein by reference in its entirety.

FIELD

The present invention relates to a display apparatus including a backlight.

BACKGROUND

Various display apparatuses as typified by liquid crystal display apparatuses are provided with a direct-lit backlight which shines light toward a back surface of a display panel (see, Patent Literature (PTL) 1, for example).

FIG. 17 is a schematic view which roughly illustrates a configuration of a conventional backlight.

A backlight 150A is disposed between a display panel of a display apparatus and a rear frame 102 provided on a back surface side of the display panel.

The backlight 150A includes a plurality of light-emitting diode (LED) substrate units 150 (three LED substrate units 150 are illustrated in FIG. 17). Each of the LED substrate units 150 is connected to an LED drive circuit 103 and is driven by power supplied from the LED drive circuit 103.

FIG. 18 is a schematic view which roughly illustrates a configuration of the LED substrate unit 150. FIG. 19 is a circuit diagram of the LED substrate unit 150.

The LED substrate unit 150 includes: a first LED substrate 150L disposed on the left side of the rear frame 102; and a second LED substrate 150R disposed on the right side of the rear frame 102. The first LED substrate 150L includes a plurality of LEDs 112 which are connected in series, a first connector 151, and a second connector 152. The second LED substrate unit 150R includes a plurality of LEDs 112 which are connected in series, and the third connector 153.

The first connector 151 includes a first terminal 151A and a second terminal 151B. The second connector 152 includes a third terminal 152A and a fourth terminal 152B. The third connector 153 includes a fifth terminal 153A and a sixth terminal 153B.

The first terminal 151A is connected to an anode of an LED 112 disposed at the start position of the series connection among the plurality of LEDs 112 disposed on the first LED substrate 150L, and also to a positive terminal of the LED drive circuit 103 via a cable 118.

The second terminal 151B is connected to the fourth terminal 152B and also to a negative terminal of the LED drive circuit 103 via a cable 120.

The third terminal 152A is connected to a cathode of an LED 112 disposed at the end position of the series connection among the plurality of LEDs 112 disposed on the first LED substrate 150L, and also to the fifth terminal 153A via a cable 154.

The fourth terminal 152B is connected to the second terminal 151B as described above, and also connected to the sixth terminal 153B via a cable 156.

The fifth terminal 153A is connected to an anode of an LED 112 disposed at the start position of the series connection among the plurality of LEDs 112 disposed on the second LED substrate 150R.

The sixth terminal 153B is connected to a cathode of an LED 112 disposed at the end position of the series connection among the plurality of LEDs 112 disposed on the second LED substrate 150R.

As described above, the LED substrate unit 150 includes the plurality of LED substrates due to the size constraint of the LED substrate.

CITATION LIST

Patent Literature

[PTL 1] Japanese Unexamined Patent Application Publication No. 2012-9220

SUMMARY

Technical Problem

Conventionally, however, the LED substrate unit 150 is formed of two LED substrates. Accordingly, each LED substrate unit 150 requires three connectors and four cables. Furthermore, the circuit configuration is different between the first LED substrate 150L and the second LED substrate 150R. For that reason, there is a problem that these factors increase the production costs of the backlight 150A and, by extension, increase the production costs of the display apparatus.

The present invention has been conceived to solve the above-described problem, and an object of the present invention is to provide a display apparatus and a backlight, which allow lower production costs compared to conventional techniques, when an LED substrate unit includes a plurality of LED substrates.

Solution to Problem

In order to achieve the above-described object, the display apparatus according to an aspect of the present invention includes: a display panel; a backlight which emits light toward a back surface of the display panel; and a power circuit which supplies power to the backlight, wherein the backlight includes one or more light-emitting diode (LED) substrate units, the one or more LED substrate units each include a first LED substrate and a second LED substrate which are arranged in a line, each of the first LED substrate and the second LED substrate includes: on a main surface thereof, a plurality of LEDs connected in series in a longitudinal direction; and a first connector which is disposed on one of short sides and includes (i) a first terminal connected to an anode of one of the plurality of LEDs which is positioned first among the plurality of LEDs connected in series, and (ii) a second terminal connected to a cathode of another one of the plurality of LEDs which is positioned last among the plurality of LEDs connected in series, the second terminal of the first connector of the first LED substrate and the first terminal of the first connector of the second LED substrate are interconnected, the first terminal of the first connector of the first LED substrate is connected to a positive terminal of the power circuit, and the second terminal of the first connector of the second LED substrate is connected to a negative terminal of the power circuit.

According to the above-described configuration, it is possible to make the first LED substrate and the second LED substrate have an equivalent configuration. In addition, the number of connectors included in each of the LED substrate units is two. Furthermore, each of the LED substrate units requires three cables i.e., a cable for connecting the first connectors, a cable for connecting the first connector of the first LED substrate and the positive terminal of the power circuit, and a cable for connecting the first connector of the second LED substrate and the negative terminal of the power circuit. For that reason, it is possible to reduce the number of the connectors and the number of the cables compared to the conventional techniques. Accordingly, it is possible to reduce the production costs compared to the conventional techniques when the LED substrate unit includes a plurality of the LED substrates.

In addition, the first connector of the first LED substrate and the first connector of the second LED substrate may be disposed at positions opposed to each other.

According to the above-described configuration, the first LED substrate and the second LED substrate are disposed next to each other in different orientations. It is therefore possible to shorten the length of the cable connecting the first LED substrate and the second LED substrate.

In addition, the display apparatus described above may further include: an inter-substrate connector that includes: a first terminal and a second terminal on one end; a third terminal and a fourth terminal on an other end; a first cable connected to the second terminal; and a second cable connected to the fourth terminal, the first terminal and the third terminal being interconnected, wherein the second terminal of the inter-substrate connector and the positive terminal of the power circuit are connected via the first cable, the fourth terminal of the inter-substrate connector and the negative terminal of the power circuit are connected via the second cable, the first terminal of the inter-substrate connector is connected to the second terminal of the first connector of the first LED substrate, the second terminal of the inter-substrate connector is connected to the first terminal of the first connector of the first LED substrate, the third terminal of the inter-substrate connector is connected to the first terminal of the first connector of the second LED substrate, and the fourth terminal of the inter-substrate connector is connected to the second terminal of the first connector of the second LED substrate.

According to the above-described configuration, the first terminal and the third terminal in the inter-substrate connector are connected in advance. It is therefore possible to connect the first LED substrate and the second LED substrate by merely connecting the first connector of the first LED substrate and the first connector of the second LED substrate, using the inter-substrate connector. In addition, since the first cable and the second cable are connected to the inter-substrate connector in advance, it is possible to eliminate time and effort for connecting the first terminal of the first connector disposed on the first LED substrate to the first cable, and time and effort for connecting second terminal of the first connector disposed on the second LED substrate to the second cable.

In addition, the terminals may have configurations as follows: one of the first terminal of the inter-substrate connector and the second terminal of the first connector of the first LED substrate has a male shape, and the other has a female shape; one of the second terminal of the inter-substrate connector and the first terminal of the first connector of the first LED substrate has the male shape, and the other has the female shape; one of the third terminal of the inter-substrate connector and the first terminal of the first connector of the second LED substrate has the male shape, and the other has the female shape; and one of the forth terminal of the inter-substrate connector and the second terminal of the first connector of the second LED substrate has the male shape, and the other has the female shape.

As described above, it is possible to directly connect the connectors by forming each pair of terminals to have a male terminal and a female terminal.

In addition, the one or more LED substrate units each may further include a third LED substrate aligned with the first LED substrate and the second LED substrate, each of the first LED substrate and the second LED substrate may further include: a second connector which is disposed on another one of the short sides and includes (i) a third terminal connected to the first terminal of the first connector, and (ii) a fourth terminal connected to an anode of one of the plurality of LEDs which is positioned first among the plurality of LEDs connected in series, the third LED substrate may have a same configuration as a configuration of the first LED substrate and the second LED substrate, the third terminal and the fourth terminal of the second connector of the first LED substrate may be interconnected, the third terminal of the second connector of the second LED substrate and the fourth terminal of the second connector of the third LED substrate may be interconnected, the fourth terminal of the second connector of the second LED substrate and the third terminal of the second connector of the third LED substrate may be interconnected, and the first terminal and the second terminal of the first connector of the third LED substrate may be interconnected.

According to the above-described configuration, it is possible to make the first LED substrate, the second LED substrate, and the third LED substrate have an equivalent configuration, and to align these three LED substrates. Accordingly, it is possible to reduce the production costs compared to the conventional techniques when the LED substrate unit includes a plurality of the LED substrates.

In addition, each of the first LED substrate, the second LED substrate, and the third LED substrate may include: a first jumper for connecting or disconnecting the first terminal and the second terminal of the first connector; and a second jumper for connecting or disconnecting the third terminal and the fourth terminal of the second connector, the third terminal and the fourth terminal of the second connector of the first LED substrate may be connected via the second jumper of the first LED substrate, the first jumper of the first LED substrate, the first jumper and the second jumper of the second LED substrate, and the second jumper of the third LED substrate may disconnect corresponding ones of the first terminal, the second terminal, the third terminal, and the fourth terminal, and the first terminal and the second terminal of the first connector of the third LED substrate may be connected via the first jumper of the third LED substrate.

According to the above-described configuration, by connecting terminals using the jumper, it is possible to remove the cable required when connecting two terminals in the same connector. For that reason, it is possible to produce the display apparatus at low costs.

In addition, the first connector of the first LED substrate and the first connector of the second LED substrate may be disposed on an opposite side of the main surface of the first LED substrate and an opposite side of the main surface of the second LED substrate, respectively.

Normally, the first LED substrate and the second LED substrate are disposed between the power circuit and the display panel. For that reason, by providing the first connector on the opposite side of the main surface of the LED circuit, connection between the first connector and the power circuit via a cable is facilitated. In addition, it is possible to shorten the length of the cable connecting the first connector and the power circuit.

A backlight according to another aspect of the present invention includes one or more light-emitting diode (LED) substrate units, wherein the one or more LED substrate units each include a first LED substrate and a second LED substrate, each of the first LED substrate and the second LED substrate includes: on a main surface thereof, a plurality of LEDs connected in series in a longitudinal direction; and a first connector which is disposed on one of short sides and includes (i) a first terminal connected to an anode of one of the plurality of LEDs which is positioned first among the plurality of LEDs connected in series, and (ii) a second terminal connected to a cathode of another one of the plurality of LEDs which is positioned last among the plurality of LEDs connected in series, the second terminal of the first connector of the first LED substrate and the first terminal of the first connector of the second LED substrate are interconnected, the first terminal of the first connector of the first LED substrate is connected to a positive terminal of the power circuit, and the second terminal of the first connector of the second LED substrate is connected to a negative terminal of the power circuit.

According to the above-described configuration, it is possible to make the first LED substrate and the second LED substrate have an equivalent configuration. In addition, the number of connectors included in each of the LED substrate units is two. Furthermore, each of the LED substrate units requires three cables i.e., a cable for connecting the first connectors, a cable for connecting the first connector of the first LED substrate and the positive terminal of the power circuit, and a cable for connecting the first connector of the second LED substrate and the negative terminal of the power circuit. For that reason, it is possible to reduce the number of the connectors and the number of the cables compared to the conventional techniques. Accordingly, it is possible to reduce the production costs compared to the conventional techniques when the LED substrate unit includes a plurality of the LED substrates.

Advantageous Effects

According to the present invention, it is possible to provide a display apparatus and a backlight, which allow lower production costs compared to conventional techniques, when an LED substrate unit includes a plurality of LED substrates.

BRIEF DESCRIPTION OF DRAWINGS

These and other objects, advantages and features of the invention will become apparent from the following description thereof taken in conjunction with the accompanying drawings that illustrate a specific embodiment of the present invention.

DESCRIPTION OF EMBODIMENTS

Hereinafter, certain exemplary embodiments are described in greater detail with reference to the accompanying Drawings. It should be noted the embodiments described below each show a specific preferable example of the present invention. The numerical values, shapes, materials, structural elements, the arrangement and connection of the structural elements etc. shown in the following exemplary embodiments are mere examples, and therefore do not limit the present invention, the scope of which is defined in the appended Claims. As such, among the structural elements in the following exemplary embodiments, structural elements not recited in any one of the independent claims are described as structural elements of a preferable embodiment, and are not absolutely necessary to overcome the problem according to the present invention.

Embodiment 1

Configuration of the Display Apparatus

Figure 1:
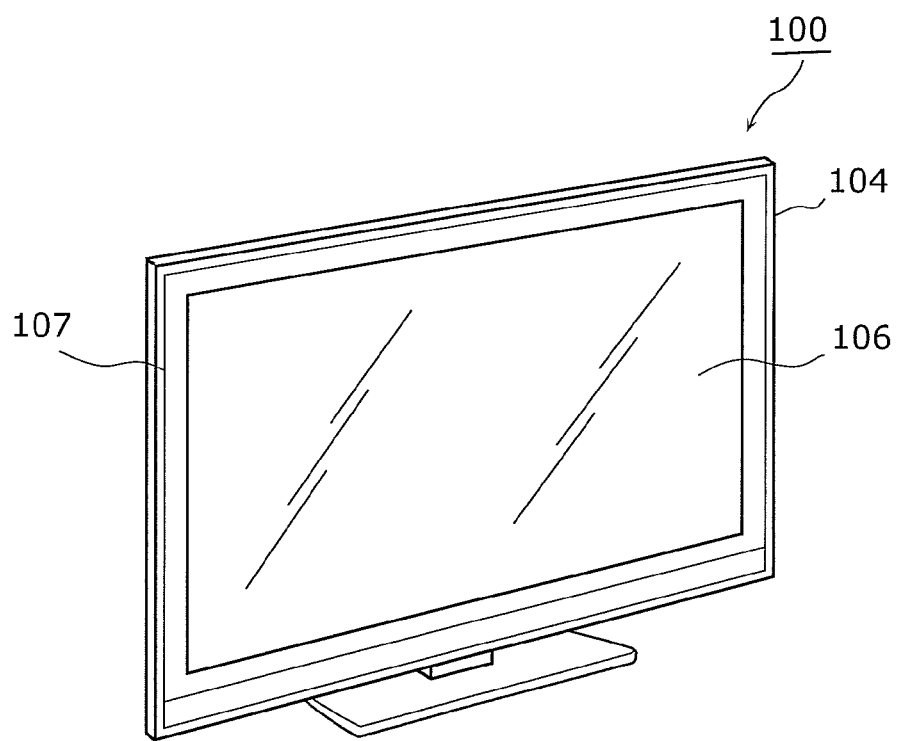
FIG. 1 is a perspective view of the front of the display apparatus according to Embodiment 1 of the present invention.
Figure 2:
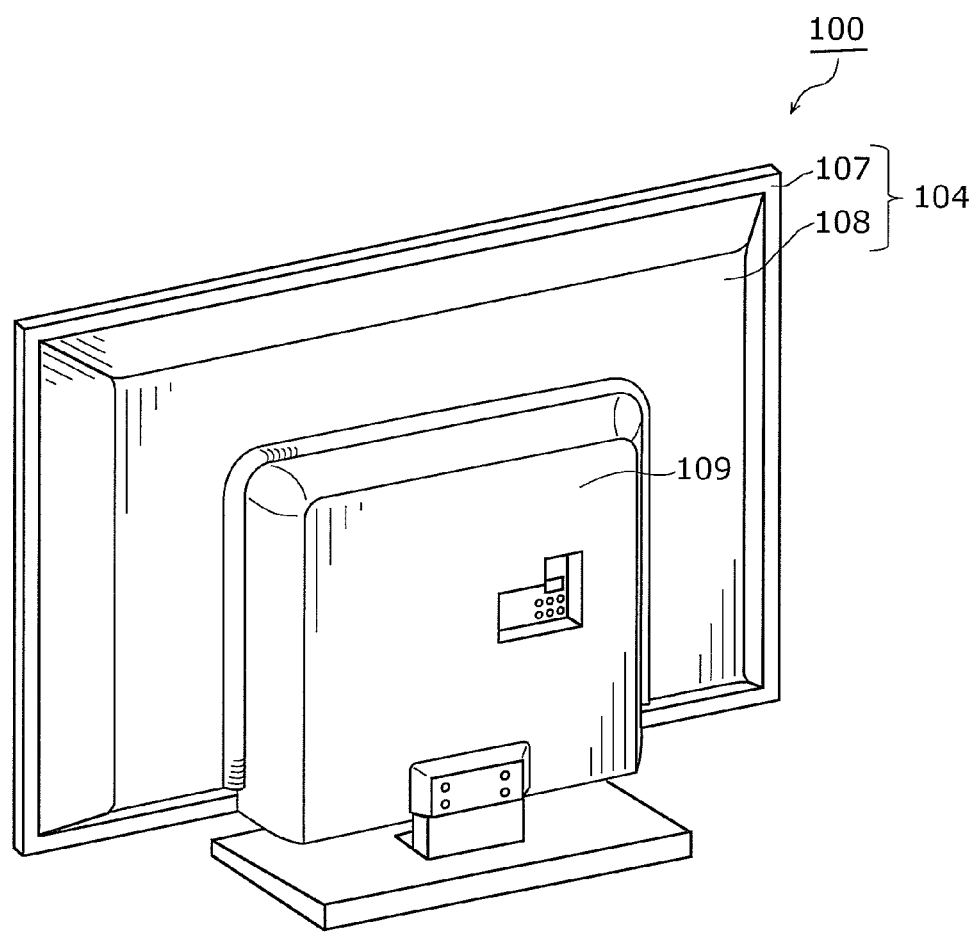
FIG. 2 is a perspective view of the back of the display apparatus illustrated in FIG. 1.

FIG. 1 is a perspective view of the front of a display apparatus according to Embodiment 1 of the present invention. FIG. 2 is a perspective view of the back of the display apparatus illustrated in FIG. 1.

A display apparatus 100 includes a housing 104 and a liquid crystal panel 106 which is an example of a display panel provided inside the housing 104. The housing 104 is formed by combining a front cabinet 107 and a rear cabinet 108 with each other. A rear cover 109 is attached to the external surface of the rear cabinet 108. It should be noted that an LED drive circuit (to be described later) is disposed between the rear cabinet 108 and the rear cover 109.

[Configuration of the LED Substrate Unit]

Figure 3:
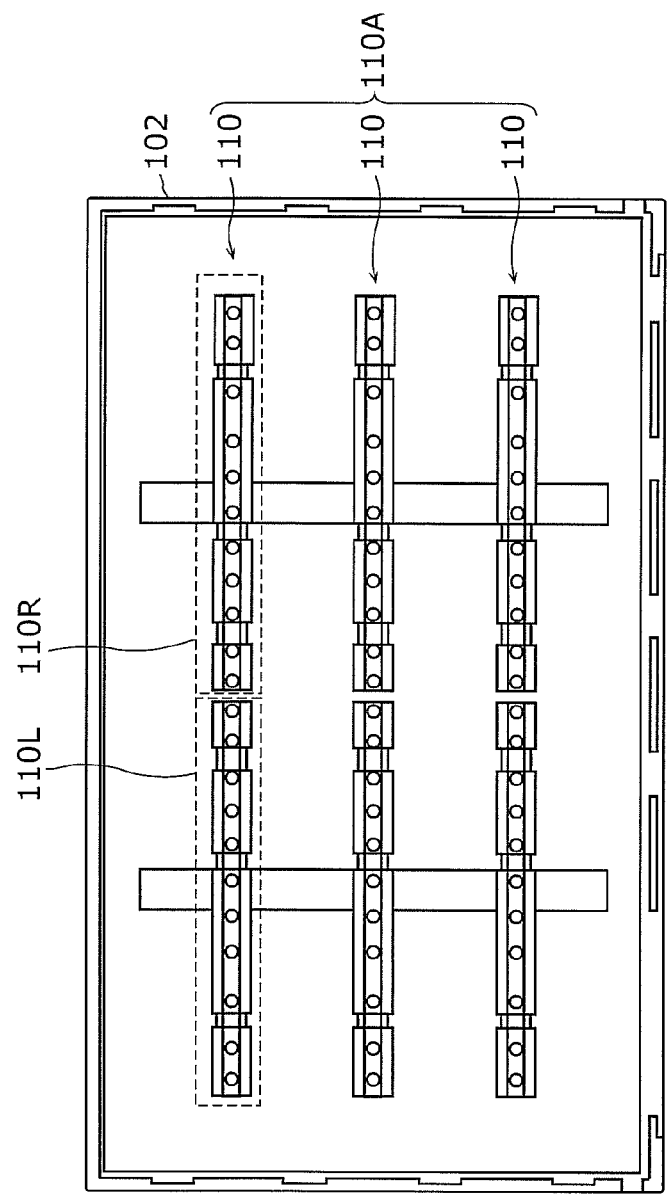
FIG. 3 is a plan view illustrating the internal configuration of the display apparatus.

FIG. 3 is a plan view illustrating the internal structure of the display apparatus 100. A rear frame 102 is disposed on the front side of the rear cabinet 108 (the front side of the display apparatus 100). The rear frame 102 is provided with a backlight 110A. The backlight 110A includes a plurality of LED substrate units 110 each of which shines light toward the back surface of the liquid crystal panel 106.

Each of the LED substrate units 110 includes a first LED substrate 110L and a second LED substrate 110R each of which shines light toward the back surface of the liquid crystal panel 106. The first LED substrate 110L and the second LED substrate 110R are aligned in the horizontal direction of the liquid crystal panel 106.

Figure 4:
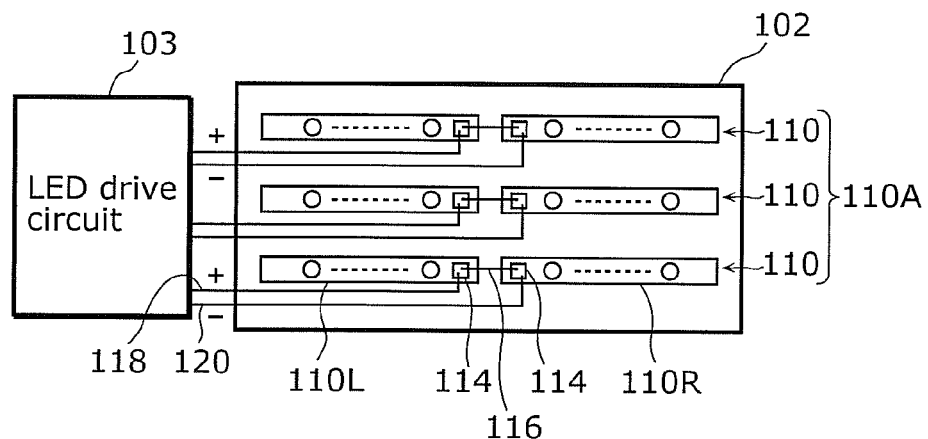
FIG. 4 is a diagram which schematically illustrates a configuration of a backlight.
Figure 5:
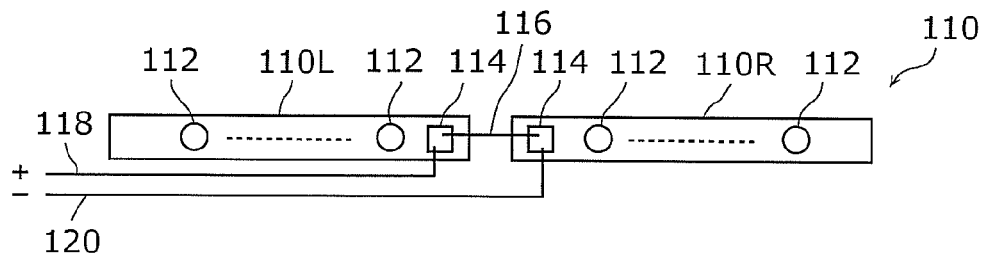
FIG. 5 is a schematic view of an LED substrate unit.

FIG. 4 is a diagram which schematically illustrates a configuration of the backlight 110A. FIG. 5 is an enlarged schematic view of the LED substrate unit 110.

Two LED substrates are connected by connecting a first connector 114 disposed on the first LED substrate 110L and a first connector 114 disposed on the second LED substrate 110R via a cable 116. In addition, a cable 118 connected to the first connector 114 disposed on the first LED substrate 110L is connected to a positive terminal of the LED drive circuit 103, and a cable 118 connected to the first connector 114 disposed on the second LED substrate 110R is connected to a negative terminal of the LED drive circuit 103. With this, the first LED substrate 110L and the second LED substrate 110R are driven by power supplied from the LED drive circuit 103 which is an example of the power circuit.

Figure 6:
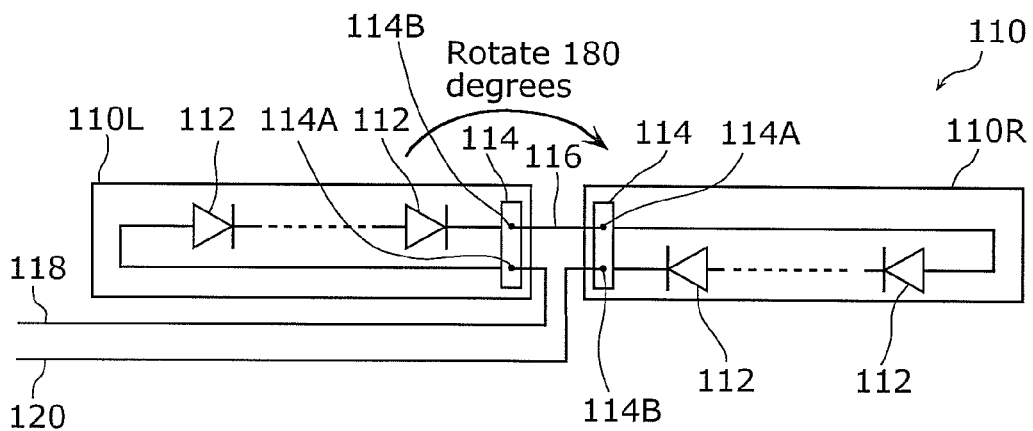
FIG. 6 is a circuit diagram of the LED substrate unit.

FIG. 6 is a circuit diagram of the LED substrate unit 110.

The first LED substrate 110L includes a plurality of LEDs 112 and the first connector 114. The plurality of LEDs 112 are aligned in series connection on the main surface of the first LED substrate 110L in the longitudinal direction thereof. The first connector 114 is disposed on one of the short sides of the first LED substrate 110L and includes a first terminal 114A and a second terminal 114B. The first terminal 114A is connected to an anode of an LED 112 disposed at the start position of the series connection among the plurality of LEDs 112. The second terminal 114B is connected to a cathode of an LED 112 disposed at the end position of the series connection among the plurality of LEDs 112.

The second LED substrate 110R and the first LED substrate 110L have different orientations but have the same configuration. More specifically, the second LED substrate 110R has the same configuration as the configuration in which the first LED substrate 110L is rotated 180 degrees in the flat surface of the rear frame 102. With this, the first connector 114 of the first LED substrate 110L and the first connector 114 of the second LED substrate 110R are disposed at positions opposed to each other.

The second terminal 114B of the first connector 114 disposed on the first LED substrate 110L and the first terminal 114A of the first connector 114 disposed on the second LED substrate 110R are connected via the cable 116.

The first terminal 114A of the first connector 114 disposed on the first LED substrate 110L is connected to a positive terminal of the LED drive circuit 103 via the cable 118.

The second terminal 114B of the first connector 114 disposed on the second LED substrate 110R is connected to a negative terminal of the LED drive circuit 103 via the cable 120.

As described above, the cable 118 and the cable 120 are extracted from around the center portion of the LED substrate unit 110.

Figure 7:
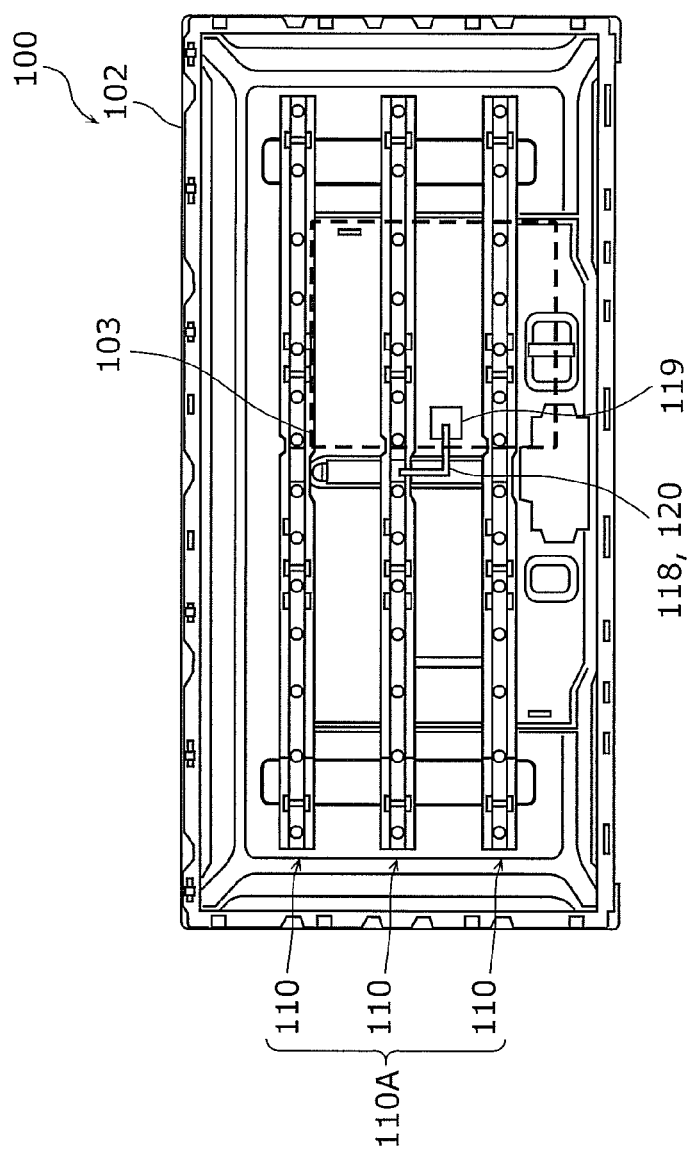
FIG. 7 is a plan view illustrating the internal structure of the display apparatus, for explaining an arrangement position of an LED drive circuit.
Figure 8:
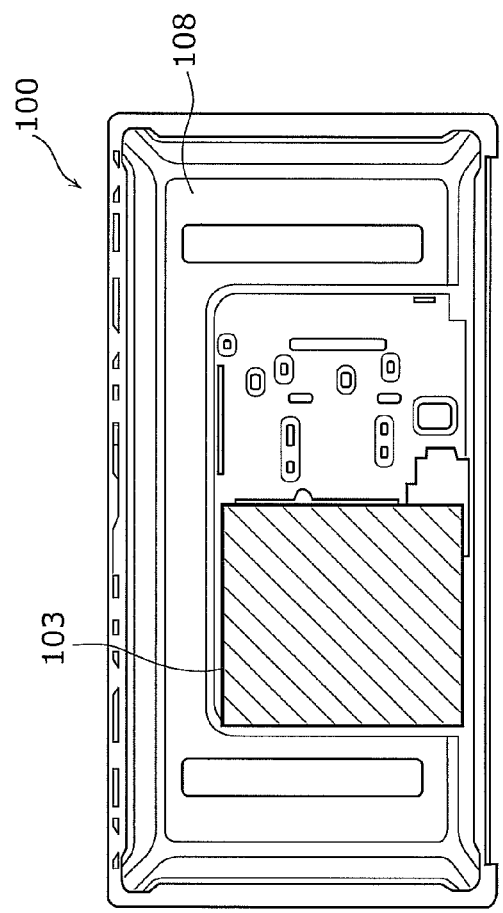
FIG. 8 is a rear view of the display apparatus with a rear cover being removed, for explaining an arrangement position of the LED drive circuit.

FIG. 7 is a plan view illustrating the internal structure of the display apparatus 100, for explaining an arrangement position of the LED drive circuit 103. FIG. 8 is a rear view of the display apparatus 100 with the rear cover 109 being removed, for explaining the arrangement position of the LED drive circuit 103.

The LED drive circuit 103 is situated substantially the center of the display apparatus 100 and between the rear cabinet 108 and the rear cover 109. It is to be noted that, as illustrated in FIG. 7, an opening 119 is defined in the rear frame 102 at the position facing the positive terminal and the negative terminal of the LED drive circuit 103. The cables 118 and 120 pass through the opening 119 to connect the LED substrate unit 110 and the LED drive circuit 103.

According to Embodiment 1 as described above, it is possible to make the first LED substrate 110L and the second LED substrate 110R have an equivalent configuration. Furthermore, each of the LED substrate units includes two connectors and three cables. For that reason, it is possible to reduce the number of the connectors and the number of the cables compared to the conventional techniques. Accordingly, it is possible to reduce the production costs compared to the conventional techniques, when the LED substrate unit includes a plurality of the LED substrates.

Furthermore, the first LED substrate 110L and the second LED substrate 110R are disposed next to each other in different orientations. For that reason, it is possible to shorten the length of the cable connecting the first LED substrate 110L and the second LED substrate 110R.

In addition, the cables 118 and 120 are extracted from around the center portion of the LED substrate unit 110. In addition, the LED drive circuit 103 is disposed around the center of the display apparatus 100. For that reason, it is possible to shorten the length of the cables 118 and 120 connecting the LED substrate unit 110 and the LED drive circuit 103.

Modification 1 of Embodiment 1

In Embodiment 1, the LED substrate unit 110 includes two LED substrates; that is, the first LED substrate 110L and the second LED substrate 110R. In this modification, an LED substrate unit which includes three or more LED substrates will be described.

Figure 9:
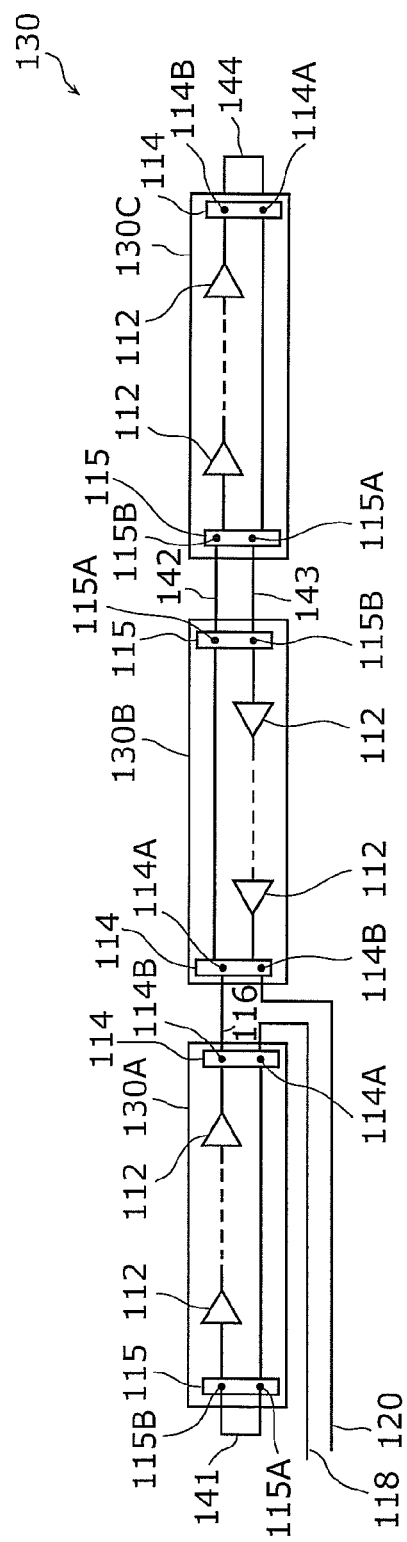
FIG. 9 is a circuit diagram which illustrates an example of the LED substrate unit including three LED substrates.

FIG. 9 is a circuit diagram which illustrates an example of the LED substrate unit including three LED substrates.

The LED substrate unit 130 includes a first LED substrate 130A, a second LED substrate 130B, and a third LED substrate 130C, each of which shines light toward the back surface of the liquid crystal panel 106. These three LED substrates are aligned in the horizontal direction of the liquid crystal panel 106.

The first LED substrate unit 130A includes a plurality of LEDs 112, a first connector 114, and a second connector 115.

The plurality of LEDs 112 are aligned in series connection on a main surface of the first LED substrate 130A in the longitudinal direction thereof.

The first connector 114 is disposed on one of the short sides of the first LED substrate 130A and includes a first terminal 114A and a second terminal 114B.

The first terminal 114A is connected to an anode of an LED 112 disposed at the start position of the series connection among the plurality of LEDs 112. The second terminal 114B is connected to a cathode of an LED 112 disposed at the end position of the series connection among the plurality of LEDs 112.

The second connector 115 is disposed on the other short side of the first LED substrate 130A and includes a third terminal 115A and a fourth terminal 115B. The third terminal 115A is connected to the first terminal 114A of the first connector 114. The fourth terminal 115B is connected to an anode of an LED 112 disposed at the start position of the series connection among the plurality of LEDs 112.

The second LED substrate 130B and the third LED substrate 130C have the same configuration as that of the first LED substrate 130A. However, the second LED substrate 130B has an orientation different from the orientation of the first LED substrate 130A and the third LED substrate 130C.

The third terminal 115A and the fourth terminal 115B of the second connector 115 disposed on the first LED substrate 130A are connected via a cable 141.

The second terminal 114B of the first connector 114 disposed on the first LED substrate 130A and the first terminal 114A of the first connector 114 disposed on the second LED substrate 130B are connected via a cable 116.

The first terminal 114A of the first connector 114 disposed on the first LED substrate 130A is connected to a positive terminal of the LED drive circuit 103 via a cable 118.

The second terminal 114B of the first connector 114 disposed on the second LED substrate 130B is connected to a negative terminal of the LED drive circuit 103 via a cable 120.

The third terminal 115A of the second connector 115 disposed on the second LED substrate 130B and the fourth terminal 115B of the second connector 115 disposed on the third LED substrate 130C are connected via a cable 142.

The fourth terminal 115B of the second connector 115 disposed on the second LED substrate 130B and the third terminal 115A of the second connector 115 disposed on the third LED substrate 130C are connected via a cable 143.

The first terminal 114A and the second terminal 114B of the first connector 114 disposed on the third LED substrate 130C are connected via a cable 144.

According to Modification 1 of Embodiment 1 as described above, it is possible to make the first LED substrate 130A, the second LED substrate 130B, and the third LED substrate 130C have an equivalent configuration, and to align these three LED substrates. Accordingly, it is possible to reduce the production costs compared to the conventional techniques when the LED substrate unit includes a plurality of the LED substrates.

It should be noted that the number of LED substrates is not limited to three, and may be four or more.

Figure 10:
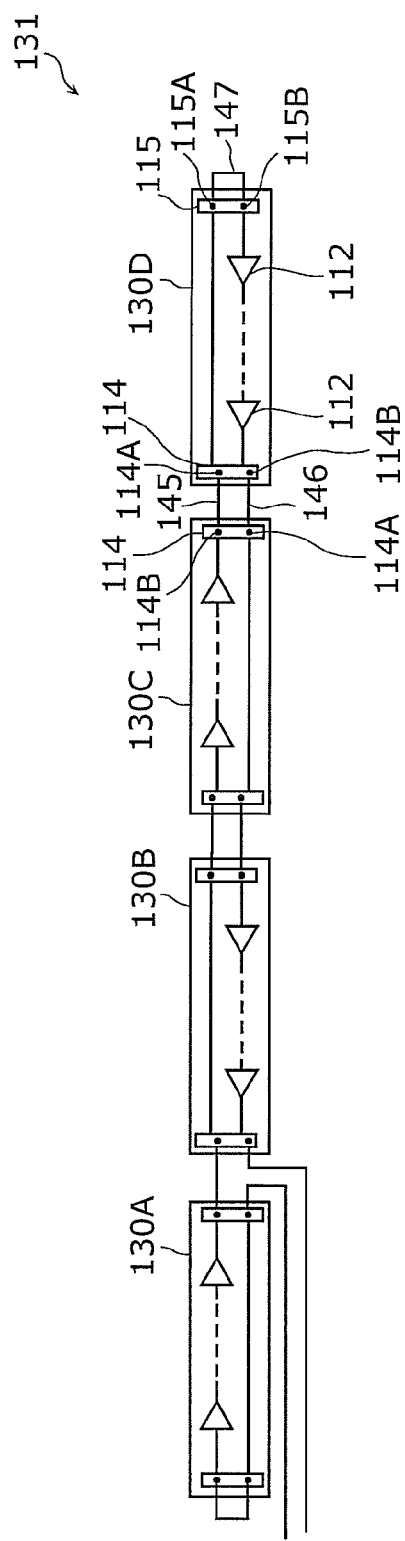
FIG. 10 is a circuit diagram which illustrates an example of the LED substrate unit including four LED substrates.

As illustrated in FIG. 10, for example, the LED substrate unit 131 may include four LED substrates, i.e., the first LED substrate 130A, the second LED substrate 130B, the third LED substrate 130C, and the fourth LED substrate 130D, which are arranged in a line. The fourth LED substrate 130D has the same circuit configuration as those of the first LED substrate 130A, the second LED substrate 130B, and the third LED substrate 130C. Furthermore, the fourth LED substrate 130D is arranged in the same orientation as the orientation of the second LED substrate 130B.

The connection of the first LED substrate 130A and the second LED substrate 130B, and the connection of the second LED substrate 130B and the third LED substrate 130C are the same as in the LED substrate unit 130 illustrated in FIG. 9. The following describes a connection scheme of the third LED substrate 130C and the fourth LED substrate 130D.

The second terminal 114B of the first connector 114 disposed on the third LED substrate 130C and the first terminal 114A of the first connector 114 disposed on the second LED substrate 130D are connected via a cable 145.

The first terminal 114A of the first connector 114 disposed on the third LED substrate 130C and the second terminal 114B of the first connector 114 disposed on the second LED substrate 130D are connected via a cable 146.

It should be noted that the third terminal 115A of the second connector 115 disposed on the fourth LED substrate 130D and the fourth terminal 115B are connected via a cable 147.

Modification 2 of Embodiment 1

In this modification, another configuration example of the LED substrate unit which includes three or more LED substrates will be described.

Figure 11:
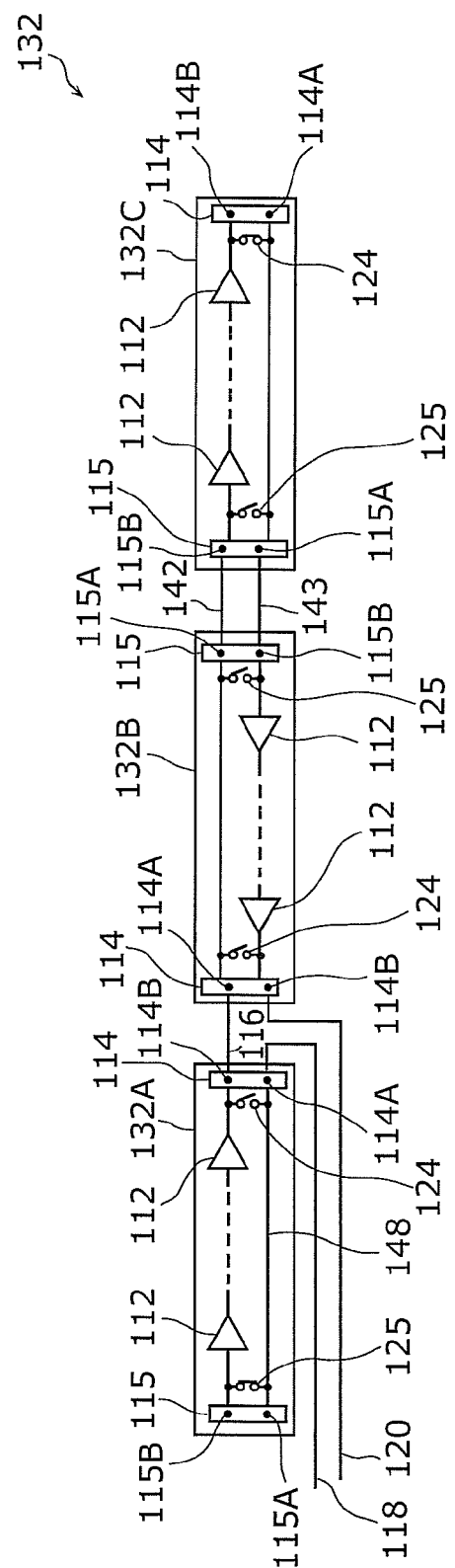
FIG. 11 is a circuit diagram which illustrates an example of the LED substrate unit including three LED substrates.

FIG. 11 is a circuit diagram which illustrates an example of the LED substrate unit including three LED substrates.

The LED substrate unit 132 includes a first LED substrate 132A, a second LED substrate 132B, and a third LED substrate 132C, each of which shines light toward the back surface of the liquid crystal panel 106. These three LED substrates are aligned in the horizontal direction of the liquid crystal panel 106.

The first LED substrate 132A further includes a first jumper 124 and a second jumper 125 in addition to the configuration of the first LED substrate 130A illustrated in FIG. 9. The first jumper 124 and the second jumper 125 are each, for example, a jumper switch, a jumper resistance, or a jumper lead, and serves as a switch for switching between connection and disconnection between two points.

The first jumper 124 is provided for connecting or disconnecting the first terminal 114A and the second terminal 114B of the first connector 114. More specifically, the first jumper 124 connects a cathode of an LED 112 disposed at the end position of the series connection among the plurality of LEDs 112 and a connecting wire 148 which connects the first terminal 114A and the third terminal 115A.

The second jumper 125 is provided for connecting or disconnecting the third terminal 115A and the fourth terminal 115B of the second connector 115. More specifically, the second jumper 125 connects an anode of an LED 112 disposed at the start position of the series connection among the plurality of LEDs 112 and the connecting wire 148 which connects the first terminal 114A and the third terminal 115A.

The second LED substrate 132B and the third LED substrate 132C have the same configuration as that of the first LED substrate 132A. However, the second LED substrate 132B has an orientation different from the orientation of the first LED substrate 132A and the third LED substrate 132C.

The connection scheme of the first LED substrate 132A and the second LED substrate 132B, and the connection scheme of the second LED substrate 132B and the third LED substrate 132C are the same as in the LED substrate unit 130 illustrated in FIG. 9.

Unlike the LED substrate unit 130, the LED substrate unit 132 does not need the cables 141 and 144. Instead, the second jumper 125 of the first LED substrate 132A and the first jumper 124 of the third LED substrate 132C each connect the terminals.

The other jumpers (the first jumper 124 of the first LED substrate 132A, the first jumper 124 and the second jumper 125 of the second LED substrate 132B, and the second jumper 125 of the third LED substrate 132C) disconnect terminals allocated to the jumpers.

According to Modification 2 of Embodiment 1 as described above, it is possible to make the first LED substrate 132A, the second LED substrate 132B, and the third LED substrate 132C have an equivalent configuration, and to align these three LED substrates. Accordingly, it is possible to reduce the production costs compared to the conventional techniques, when the LED substrate unit includes a plurality of LED substrates.

In addition, by connecting terminals using a jumper, it is possible to remove the cable which is required for connecting two terminals in the same connector. For that reason, it is possible to produce the display apparatus at low costs.

It should be noted that the number of LED substrates is not limited to three, and may be four or more.

Figure 12:
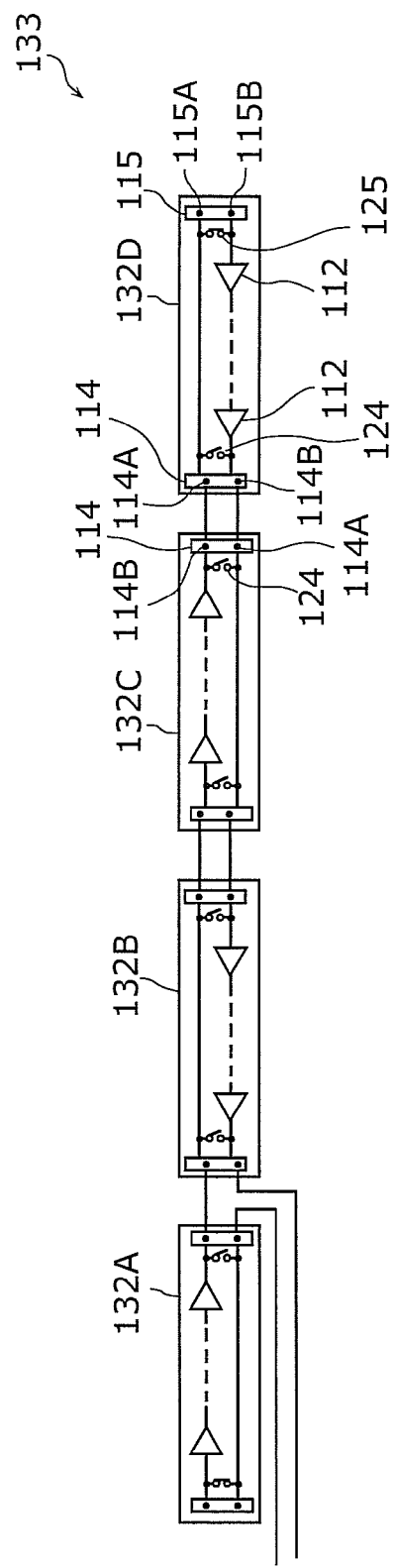
FIG. 12 is a circuit diagram which illustrates an example of the LED substrate unit including four LED substrates.

As illustrated in FIG. 12, for example, the LED substrate unit 133 may include four LED substrates, i.e., the first LED substrate 132A, the second LED substrate 132B, the third LED substrate 132C, and the fourth LED substrate 132D, which are arranged in a line. The fourth LED substrate 132D has the same circuit configuration as those of the first LED substrate 132A, the second LED substrate 132B, and the third LED substrate 132C. Furthermore, the fourth LED substrate 132D and the second LED substrate 132B are arranged in the same orientation.

The connection scheme of the first LED substrate 132A and the second LED substrate 132B, and the connection scheme of the second LED substrate 132B and the third LED substrate 132C are the same as in the LED substrate unit 132 illustrated in FIG. 11. The following describes a connection scheme of the third LED substrate 132C and the fourth LED substrate 132D.

The second terminal 114B of the first connector 114 disposed on the third LED substrate 132C and the first terminal 114A of the first connector 114 disposed on the fourth LED substrate 132D are connected via the cable 145.

The first terminal 114A of the first connector 114 disposed on the third LED substrate 132C and the second terminal 114B of the first connector 114 disposed on the fourth LED substrate 132D are connected via the cable 146.

It should be noted that the first jumper 124 of the third LED substrate 132C disconnects the first terminal 114A and the second terminal 114B of the first connector 114.

In addition, the first jumper 124 of the fourth LED substrate 132D disconnects the first terminal 114A and the second terminal 114B of the first connector 114, and the second jumper 125 connects the third terminal 115A and the fourth terminal 115B of the second connector 115.

Embodiment 2

In Embodiment 1, two LED substrates are connected via a cable. This embodiment differs from Embodiment 1 in that two LED substrates are connected via a connector.

In the following description, differences from Embodiment 1 will be focused.

The LED substrate unit according to Embodiment 2 includes the first LED substrate 110L and the second LED substrate 110R as with Embodiment 1.

Figure 13:
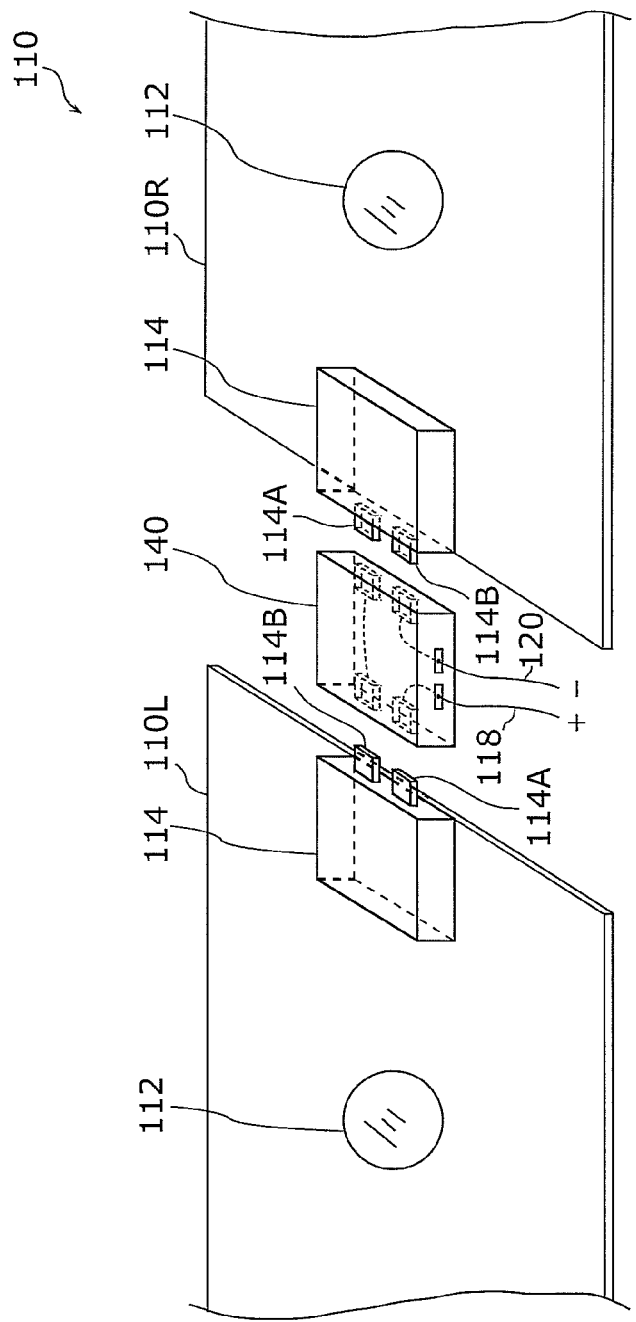
FIG. 13 is an enlarged perspective view of the center portion of the LED substrate unit according to Embodiment 2 of the present invention.

FIG. 13 is an enlarged perspective view of the center portion of the LED substrate unit 110 according to Embodiment 2 of the present invention.

The first terminal 114A and the second terminal 114B of the first connector 114 each have the shape of a male terminal. These two first connectors 114 are each connected to an inter-substrate connector 140 which includes terminals each having the shape of a female terminal. Furthermore, these two first connectors 114 are disposed on the main surfaces of their respective first LED substrates.

Figure 14:
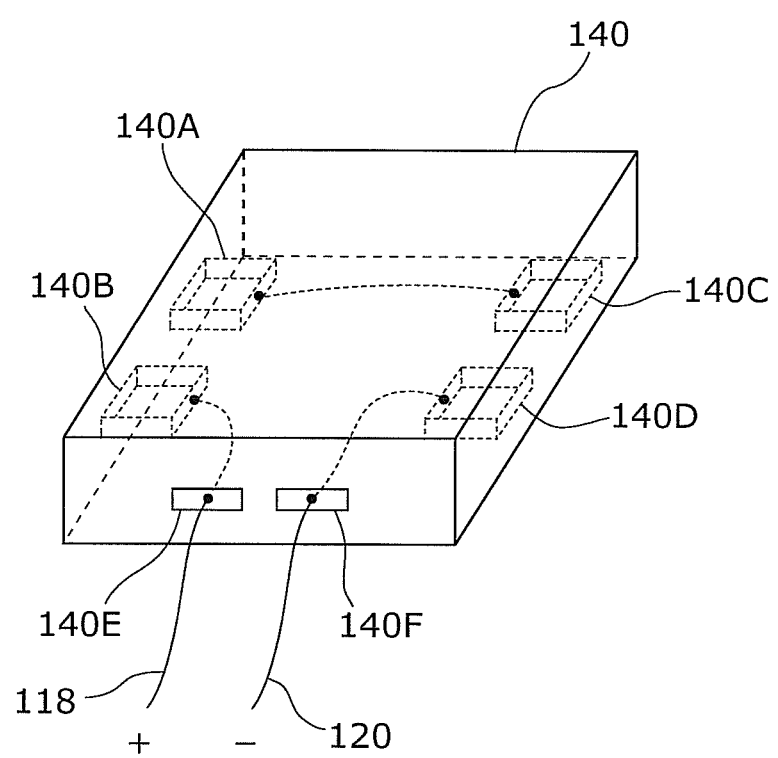
FIG. 14 is a diagram which illustrates a configuration of an inter-substrate connector.

FIG. 14 is a diagram which illustrates a configuration of the inter-substrate connector 140. The inter-substrate connector 140 includes a first terminal 140A, a second terminal 140B, a third terminal 140C, and a fourth terminal 140D, each of which is a female terminal. In addition, the inter-substrate connector 140 has a first opening 140E and a second opening 140F.

The first terminal 140A and the third terminal 140C are connected inside the inter-substrate connector 140.

A cable 118 is extracted from the second terminal 140B through the first opening 140E. In addition, a cable 120 is extracted from the fourth terminal 140D through the second opening 140F.

Figure 15:
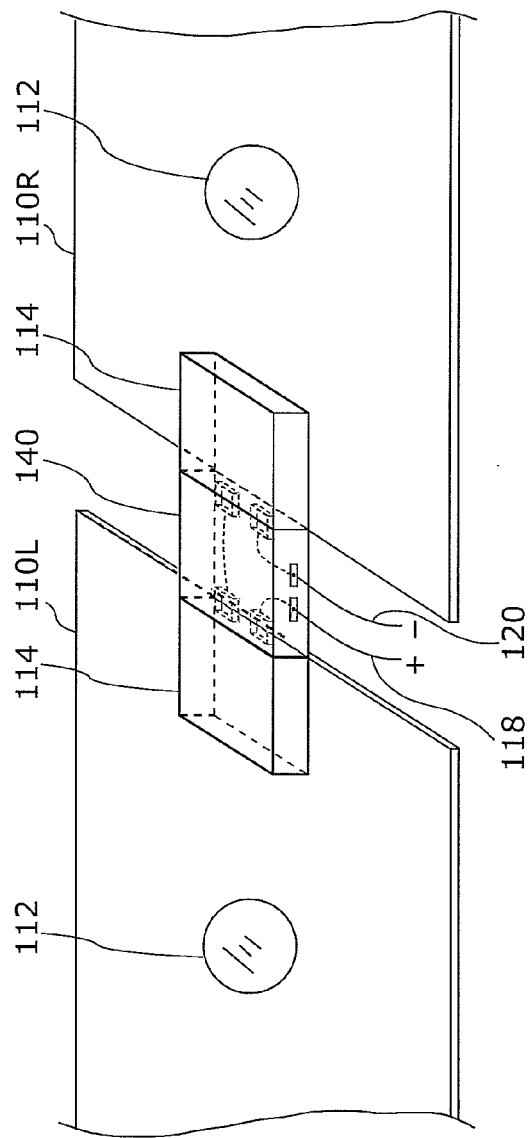
FIG. 15 is an enlarged perspective view of the center portion of the LED substrate unit after two first connectors are each connected to the inter-substrate connector.

FIG. 15 is an enlarged perspective view of the center portion of the LED substrate unit 110 after these two first connectors 114 are each connected to the inter-substrate connector 140. As illustrated in FIG. 15, employment of the inter-substrate connector 140 makes it possible to connect these two first connectors 114 without a cable.

According to Embodiment 2 as described above, the first terminal 140A and the third terminal 140C of the inter-substrate connector 140 are connected in advance. For that reason, it is possible to connect the first LED substrate 110L and the second LED substrate 110R by merely connecting the first connector 114 of the first LED substrate 110L and the first connector 114 of the second LED substrate 110R using the inter-substrate connector 140. Furthermore, since the cable 118 and the cable 120 are connected to the inter-substrate connector 140 in advance, it is possible to eliminate time and effort for connecting the first terminal 114A of the first connector 114 disposed on the first LED substrate 110L to the cable 118, and time and effort for connecting second terminal 114B of the first connector 114 disposed on the second LED substrate 110R to the cable 120.

In addition, it is possible to directly connect the connectors by forming each pair of the terminals to have a male terminal and a female terminal.

It should be noted that, although the first connector 114 is disposed on the main surface of the LED substrate according to Embodiment 2, the first connector 114 may be disposed on the opposite side of the main surface of the LED substrate.

Figure 16:
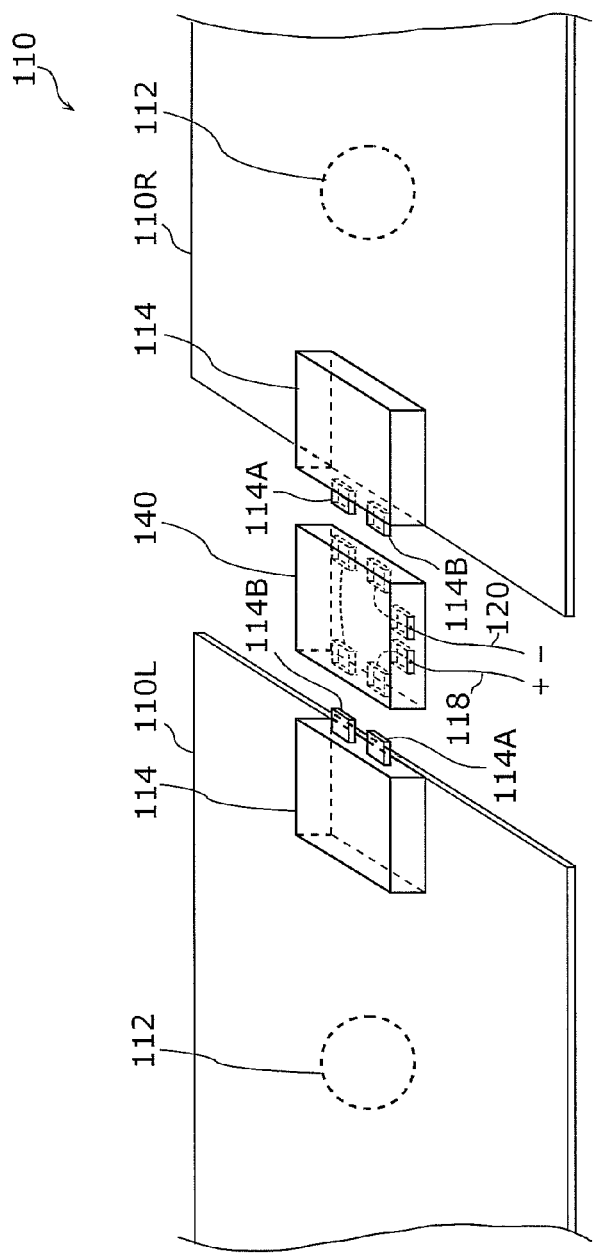
FIG. 16 is an enlarged perspective view of the center portion of the opposite side of the main surface of the LED substrate unit.
Figure 17:
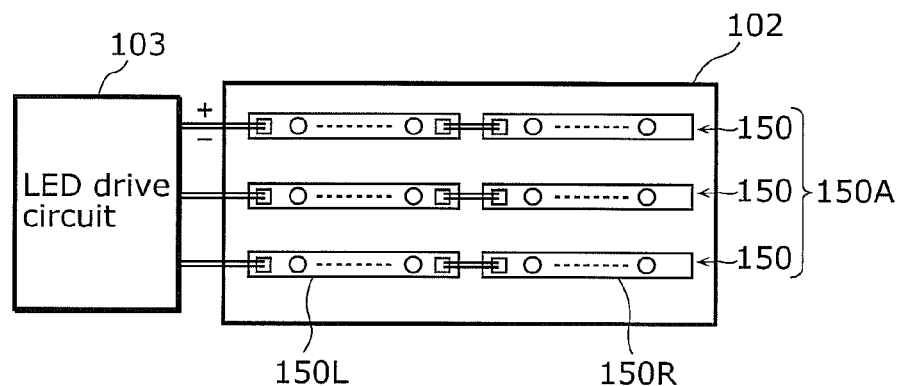
FIG. 17 is a schematic view which roughly illustrates a configuration of a conventional backlight.
Figure 18:
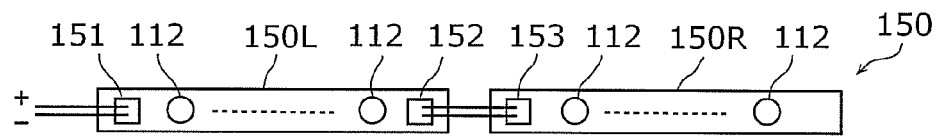
FIG. 18 is a schematic view which roughly illustrates a configuration of the LED substrate unit.
Figure 19:
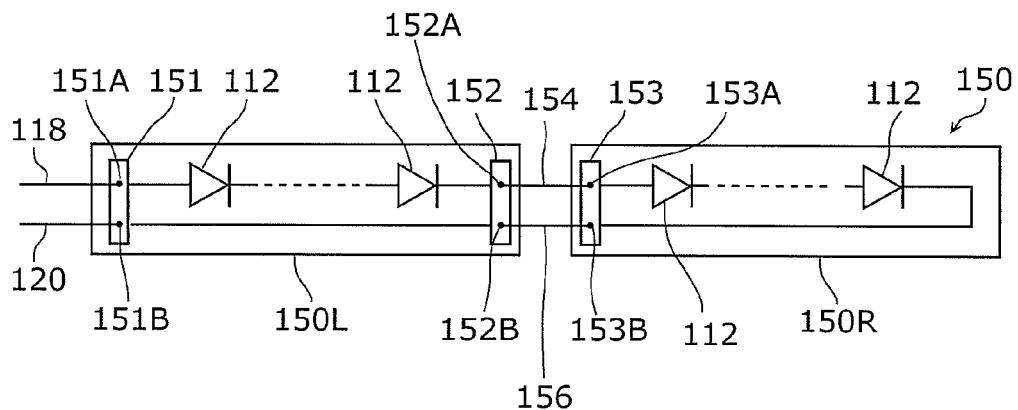
FIG. 19 is a circuit diagram of the LED substrate unit.

FIG. 16 is an enlarged perspective view of the center portion of the side of the opposite side of the main surface of the LED substrate unit 110. As illustrated in FIG. 16, two first connectors 114 and the inter-substrate connector 140 are connected on the opposite side of the main surface.

Normally, the first LED substrate 110L and the second LED substrate 110R are disposed between the LED drive circuit 103 and the liquid crystal panel 106. For that reason, by providing the first connector 114 on the opposite side of the main surface of the LED circuit, connection between the first connector 114 and the LED drive circuit 103 via a cable is facilitated. In addition, it is possible to shorten the length of the cable connecting the first connector 114 and the LED drive circuit 103.

The display apparatus and the backlight according to the embodiments of the present invention have hereinbefore been described, but the present invention is not limited to these embodiments.

For example, the direct-lit backlight has been described in Embodiments 1 and 2, but the backlight described in Embodiments 1 and 2 may be applied to an edge-lit backlight.

In addition, the above-described embodiments and modifications may be arbitrarily combined.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The present invention is applicable to, for example, a liquid crystal television, a liquid crystal display apparatus, and so on, as a display apparatus including an LED backlight.

The invention claimed is:

1. A display apparatus comprising:
a display panel;
a backlight which emits light toward a back surface of the display panel; and
a power circuit which supplies power to the backlight,
wherein the backlight includes one or more light-emitting diode (LED) substrate units,
the one or more LED substrate units each include a first LED substrate and a second LED substrate which are arranged in a line,
each of the first LED substrate and the second LED substrate includes:
on a main surface thereof, a plurality of LEDs electrically connected in series and arranged in a longitudinal direction; and
a first connector which is disposed on one of short sides and includes (i) a first terminal connected to an anode of one of the plurality of LEDs which is positioned first among the plurality of LEDs connected in series, and (ii) a second terminal connected to a cathode of another one of the plurality of LEDs which is positioned last among the plurality of LEDs connected in series,
the second terminal of the first connector of the first LED substrate and the first terminal of the first connector of the second LED substrate are interconnected,
the first terminal of the first connector of the first LED substrate is connected to a positive terminal of the power circuit, and
the second terminal of the first connector of the second LED substrate is connected to a negative terminal of the power circuit.

2. The display apparatus according to claim 1,
wherein the first connector of the first LED substrate and the first connector of the second LED substrate are disposed at positions opposed to each other.

3. The display apparatus according to claim 2, further comprising
an inter-substrate connector including: a first terminal and a second terminal on one end; a third terminal and a fourth terminal on an other end; a first cable connected to the second terminal; and a second cable connected to the fourth terminal, the first terminal and the third terminal being interconnected,
wherein the second terminal of the inter-substrate connector and the positive terminal of the power circuit are connected via the first cable,
the fourth terminal of the inter-substrate connector and the negative terminal of the power circuit are connected via the second cable,
the first terminal of the inter-substrate connector is connected to the second terminal of the first connector of the first LED substrate, the second terminal of the inter-substrate connector is connected to the first terminal of the first connector of the first LED substrate,
the third terminal of the inter-substrate connector is connected to the first terminal of the first connector of the second LED substrate, and
the fourth terminal of the inter-substrate connector is connected to the second terminal of the first connector of the second LED substrate.

4. The display apparatus according to claim 3,
wherein: one of the first terminal of the inter-substrate connector and the second terminal of the first connector of the first LED substrate has a male shape, and the other has a female shape;
one of the second terminal of the inter-substrate connector and the first terminal of the first connector of the first LED substrate has the male shape, and the other has the female shape;
one of the third terminal of the inter-substrate connector and the first terminal of the first connector of the second LED substrate has the male shape, and the other has the female shape; and
one of the forth terminal of the inter-substrate connector and the second terminal of the first connector of the second LED substrate has the male shape, and the other has the female shape.

5. The display apparatus according to claim 1,
wherein the one or more LED substrate units each further include a third LED substrate aligned with the first LED substrate and the second LED substrate,
each of the first LED substrate and the second LED substrate further include: a second connector which is disposed on another one of the short sides and includes (i) a third terminal connected to the first terminal of the first connector, and (ii) a fourth terminal connected to an anode of one of the plurality of LEDs which is positioned first among the plurality of LEDs connected in series,
the third LED substrate has a same configuration as a configuration of the first LED substrate and the second LED substrate,
the third terminal and the fourth terminal of the second connector of the first LED substrate are interconnected,
the third terminal of the second connector of the second LED substrate and the fourth terminal of the second connector of the third LED substrate are interconnected,
the fourth terminal of the second connector of the second LED substrate and the third terminal of the second connector of the third LED substrate are interconnected, and
the first terminal and the second terminal of the first connector of the third LED substrate are interconnected.

6. The display apparatus according to claim 5,
wherein each of the first LED substrate, the second LED substrate, and the third LED substrate includes:
a first jumper for connecting or disconnecting the first terminal and the second terminal of the first connector; and
a second jumper for connecting or disconnecting the third terminal and the fourth terminal of the second connector,
the third terminal and the fourth terminal of the second connector of the first LED substrate are connected via the second jumper of the first LED substrate, the first jumper of the first LED substrate, the first jumper and the second jumper of the second LED substrate, and the second jumper of the third LED substrate disconnect corresponding ones of the first terminal, the second terminal, the third terminal, and the fourth terminal, and the first terminal and the second terminal of the first connector of the third LED substrate are connected via the first jumper of the third LED substrate.

7. The display apparatus according to claim 1, wherein the first connector of the first LED substrate and the first connector of the second LED substrate are disposed on an opposite side of the main surface of the first LED substrate and an opposite side of the main surface of the second LED substrate, respectively.

8. A backlight comprising one or more light-emitting diode (LED) substrate units, wherein the one or more LED substrate units each include a first LED substrate and a second LED substrate, each of the first LED substrate and the second LED substrate includes:

on a main surface thereof, a plurality of LEDs electrically connected in series and arranged in a longitudinal direction; and a first connector which is disposed on one of short sides and includes (i) a first terminal connected to an anode of one of the plurality of LEDs which is positioned first among the plurality of LEDs connected in series, and (ii) a second terminal connected to a cathode of another one of the plurality of LEDs which is positioned last among the plurality of LEDs connected in series, the second terminal of the first connector of the first LED substrate and the first terminal of the first connector of the second LED substrate are interconnected, the first terminal of the first connector of the first LED substrate is connected to a positive terminal of a power circuit, and the second terminal of the first connector of the second LED substrate is connected to a negative terminal of the power circuit.

\* \* \* \* \*